United States Patent [19]
Jacobson et al.

[11] Patent Number: 5,982,121
[45] Date of Patent: Nov. 9, 1999

[54] INTELLIGENT TORQUE LIMITING THROUGH CURRENT SENSING

[75] Inventors: Gary Jacobson, Norwalk; Doug Clark, Wallingford; Mark Sievel, Newtown; Wesley Kirschner, Hamden, all of Conn.

[73] Assignee: Pitney Bowes Inc., Stamford, Conn.

[21] Appl. No.: 08/992,822

[22] Filed: Dec. 17, 1997

[51] Int. Cl.⁶ .................................................. H02P 5/40
[52] U.S. Cl. ........................ 318/434; 318/430; 318/431; 361/93
[58] Field of Search ................................ 318/430–446, 318/30–80; 361/20–34, 93, 91; 323/349

[56] References Cited

U.S. PATENT DOCUMENTS

| | | | |
|---|---|---|---|
| 4,670,698 | 6/1987 | Fulton et al. ........................... | 318/802 |
| 4,789,834 | 12/1988 | Koopman ................................. | 524/417 |
| 5,061,884 | 10/1991 | Saganovsky ............................. | 318/431 |
| 5,063,338 | 11/1991 | Capel et al. ............................ | 318/685 |
| 5,350,988 | 9/1994 | Le ............................................ | 318/618 |
| 5,489,840 | 2/1996 | Caron ...................................... | 323/349 |

*Primary Examiner*—Paul Ip
*Attorney, Agent, or Firm*—Ronald Reichman; Melvin J. Scolnick; Robert Meyer

[57] ABSTRACT

A system that limits the torque of motors and discontinues motion control activity of system components in order to protect electrical and mechanical system hardware. Mechanical stresses are controlled by a microprocessor in a manner that they will not exceed predefined limits so that mechanical components will not be destroyed. Thus, replacement of major system components such as drive electronics and fuses may be avoided. Hence, there will be a reduction in service calls to repair the motors and system components.

10 Claims, 2 Drawing Sheets

INTELLIGENT TORQUE LIMITING THROUGH CURRENT SENSING

FIELD OF THE INVENTION

The invention relates generally to the field of sensing devices and more particularly to current sensing devices that are used to limit torque.

BACKGROUND OF THE INVENTION

Electric motors receive electrical energy and convert the electric energy into mechanical energy or torque. The rotary direct current electric motor delivers mechanical power by means of a rotating shaft extending from one or both ends of its enclosure. When a rotary direct current motor is first connected to an electric supply, there is a large surge of current because nothing in the motor opposes the flow of current except the armature resistance, which is very low. As the motor accelerates the counter emf increases which causes the armature current to decrease. The current decreases as the motor accelerates until a point of equilibrium is reached where the current drawn by the motor from is the power source just balances the requirement of the driven load at a constant speed.

As long as the motor-driven load remains constant, the motor speed remains constant. If the load on the motor is increased, the motor speed decreases. This decrease in speed causes a decrease in the counter emf, which in turn allows the motor to draw more current from the power supply, which in turn causes the motor to develop more torque to carry the increased load at a slightly lower speed. If the motor load continues to increase, the motor will continue to develop additional torque and continue to slow down. As the load continues to increase the motor will have to be turned off to prevent damaging the motor. The prior art utilized electrical circuit breakers like fuses to protect electrical devices from excessive currents. In a typical fuse, there is a time delay between the first sensing of the high current and the blowing of the fuse. The blowing of the fuse caused the motor to stop. Thus, a problem with the prior art was that intervention would be required for the fuse to blow and time would be required to replace the fuse.

Prior art Motor systems employed in paper handling equipment used a Positive Temperature Coefficient resistor (PTC) or a Polyfuse to control excessive current. The positive temperature coefficient resistor was placed in series with the motor and acted somewhat like a fuse. If the Motor stalled, the current drastically increased and the PTC heated up. When the PTC heated up, the resistance increased, which caused the current to decrease, thus preventing the motor from becoming a fire hazard. The use of PTC type devices also eliminates the need to replace fuses. Since the motor can be shut off, the PTC device cools and the motor can be returned to normal service.

If a paper jam would occur in paper handling equipment that utilized PTC type devices and fuses, typically it would take too long for the PTC device to heat up and limit the current before the fuse would blow. The foregoing was true even if a slow blowing fuse with a time delay was used. Thus, a simple paper jam may necessitate a service call to repair the damage.

Many different types of systems utilize electric motors to move material through the system, i.e., photocopiers, integrated mailing systems, etc. The above systems utilize closed-loop motion control circuits to monitor and control the torque of individual motors. The torque limiting was accomplished by utilizing analog set points and analog circuitry to measure the current required by the motor. If the current exceeded a preset threshold, the torque limiter would reduce the current or turn off the motor.

A disadvantage of the foregoing is that the system was inflexible, since the system was dealing with fixed set points. The above system would turn off the motor when the set point was reached, regardless of the existing machine or motor operation. The system may turn off the motor when the motor should not be turned off, i.e., the set point was set too low. The above system was also subject to false triggers from transient currents. Furthermore, if the current thresholds were set too high, the drivers could fail and the fuse protecting the circuit could blow, necessitating a service call to repair the motor or machine.

SUMMARY OF THE INVENTION

This invention overcomes the disadvantages of the prior art by providing a system that limits the torque of motors and discontinues motion control activity of system components in order to protect electrical and mechanical system hardware. Mechanical stresses are controlled in a manner so that they will not exceed predefined limits, in order that mechanical components will not be destroyed. Thus, replacement of major system components, such as drive electronics and fuses, may be avoided. Hence, there will be a reduction in service calls to repair the motors and system components.

Another advantage of this invention is that paper jams can be made less severe (in the folder) by turning the motor off sooner. This reduces the number of service calls that would have been required to disassemble the machine to clear the jam.

An additional advantage of this invention is that the software of the invention can ignore very high, short duration current spikes and shut down the motor faster then the PTC can. Another disadvantage of PTC's and fuses is that they are only available in certain discrete values, which could also complicate the selection process. It is also easier to change the maximum current setting of the current sensing device of this invention than it was to change the maximum current setting of prior art PTC's or fuses.

A further advantage of this invention is that the motor can be shut down before the paper jam becomes so bad that it is not possible for the operator to clear the paper jam. This also reduces the number of required service calls.

The foregoing is accomplished by placing a current sensing device in each motor drive circuit in the system. Each current sensing device develops a signal that is proportional to the current moving through the drive circuit and motor. The signals produced by the current sensing device are summed, amplified and filtered to produce an aggregate signal or "signature" of operation of the drive function being performed. The signature is captured and stored digitally via an A/D converter. This signature is then compared to a predetermined threshold. Portions of the signature exceeding the threshold for more than a predetermined time, i.e. the time required to sample the condition three times (12 ms), are deemed an indication of excessive energy or power. This may indicate that a motor has too much torque and that a paper jam condition is in progress in the system. A microprocessor connected to the A/D converter terminates motor activity in the system and indicates the error.

The program in the microprocessor samples the inputs through an A/D converter. If the inputs are above a threshold level for more than a predetermined time, the microprocessor immediately turns off the motors that can cause the current to rise. The program then provides the operator of the system with a message indicating that there was a problem. The operator of the system then removes the paper from the system that was driven by the turned off motors. At this point, the operator may use the diagnostics of the system to run specific tests to determine the motor that caused the over-current condition or to have the system continue processing material.

DETAILED DESCRIPTION OF THE PREFERRED EMBODIMENT

Figure 1:
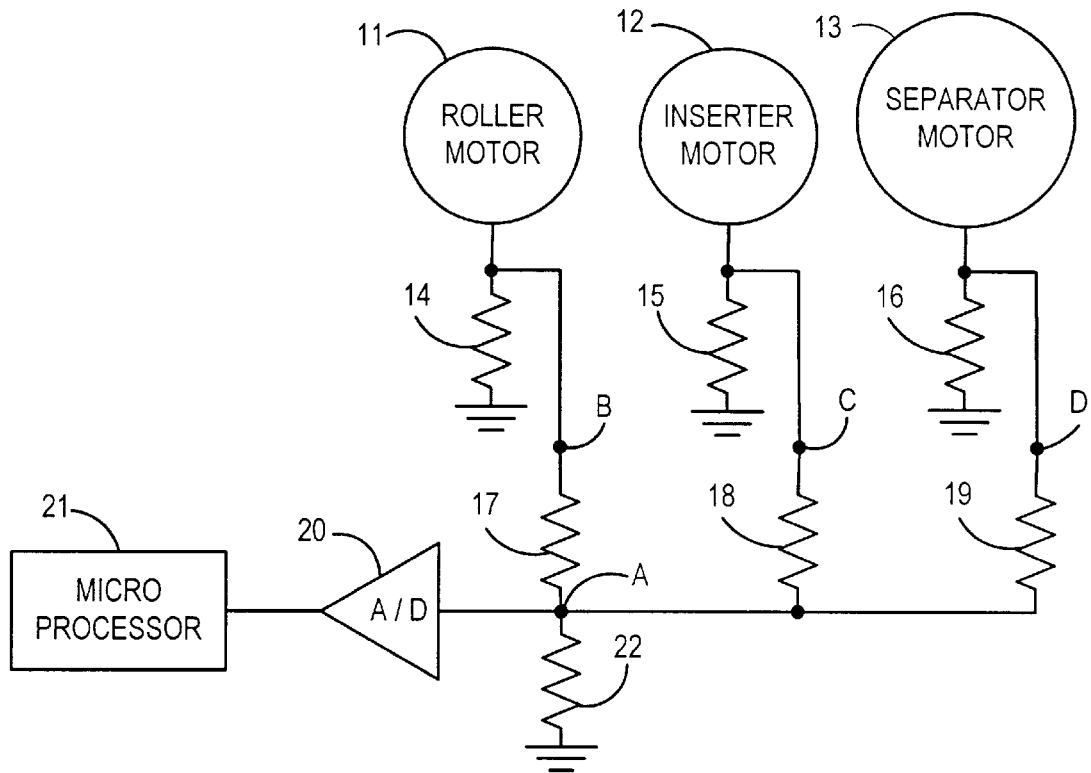
FIG. 1 is a drawing of the apparatus of this invention.

Referring now to the drawings in detail, and more particularly to FIG. 1, the reference character 11 represent a roller motor. Motor 11 is connected to one end of current sensing resistor 14 and the other end of resistor 14 is connected to ground. Motor 11 is also connected to one end of isolation resistor 17 and the other end of resistor 17 is connected to A/D converter 20. Inserting motor 12 is connected to one end of current sensing resistor 15 and the other end of resistor 15 is connected to ground. Motor 12 is also connected to one end of isolation resistor 18 and the other end of resistor 18 is connected to A/D converter 20. Separator motor 13 is connected to one end of current sensing resistor 16 and the other end of resistor 16 is connected to ground. Motor 13 is also connected to one end of isolation resistor 19 and the other end of resistor 19 is connected to A/D converter 20. The other end of resistor 22 is connected to ground. It will be obvious to one skilled in the art that additional motors may be utilized and the motors may be connected to many different types of devices. A/D converter 20 is coupled to microprocessor 21.

Isolation resistors 17,18 and 19 are used to isolate motors 11,12 and 13 from the rest of the circuit. The sum of the currents sensed by resistors 14, 15 and 16 will appear at node A without interfering with the remainder of this circuit. Thus, node A represents the aggregate currents sensed by resistors 14, 15 and 16. Motors 11, 12 and 13 draw large amounts of current at different times. Therefore, in this embodiment, it is not important to know which motor is drawing a large amount of current at a particular time.

It is also possible to sense the individual current form motors 11, 12 and 13 by having the input channel of A/D converter 20 connected to points B, C or D.

Figure 2:
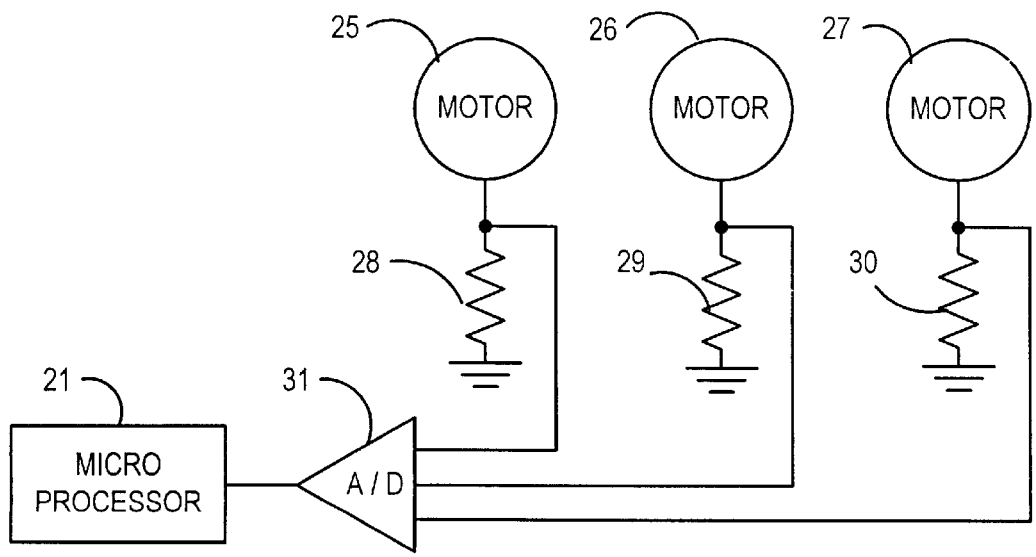
FIG. 2 is an alternate embodiment of the apparatus shown in FIG. 1.

FIG. 2 is an alternate embodiment of the invention shown in FIG. 1. This embodiment is used when motors 25, 26 and 27 are drawing substantial currents at the same time. Motor 25 may be a motor that supplies power to a roller, motor 26 may be a motor that supplies power to an inserter and motor 27 may be a motor that supplies power to a separator. It will be obvious to one skilled in the art that additional motors may be utilized and that the motors may supply power to many different types of devices. Motor 25 is connected to one end of current sensing resistor 28 and the other end of resistor 28 is connected to ground. Motor 25 is also connected to A/D converter 31. Motor 26 is connected to one end of current sensing resistor 29 and the other end of resistor 29 is connected to ground. Motor 26 is also connected to A/D converter 31. Motor 27 is connected to one end of current sensing resistor 30 and the other end of resistor 30 is connected to ground. Motor 27 is also connected to A/D converter 31. A/D converter 31 is connected to microprocessor 21. Thus, the above circuit 20 individually senses the current used by motors 25, 26 and 27.

Figure 3:
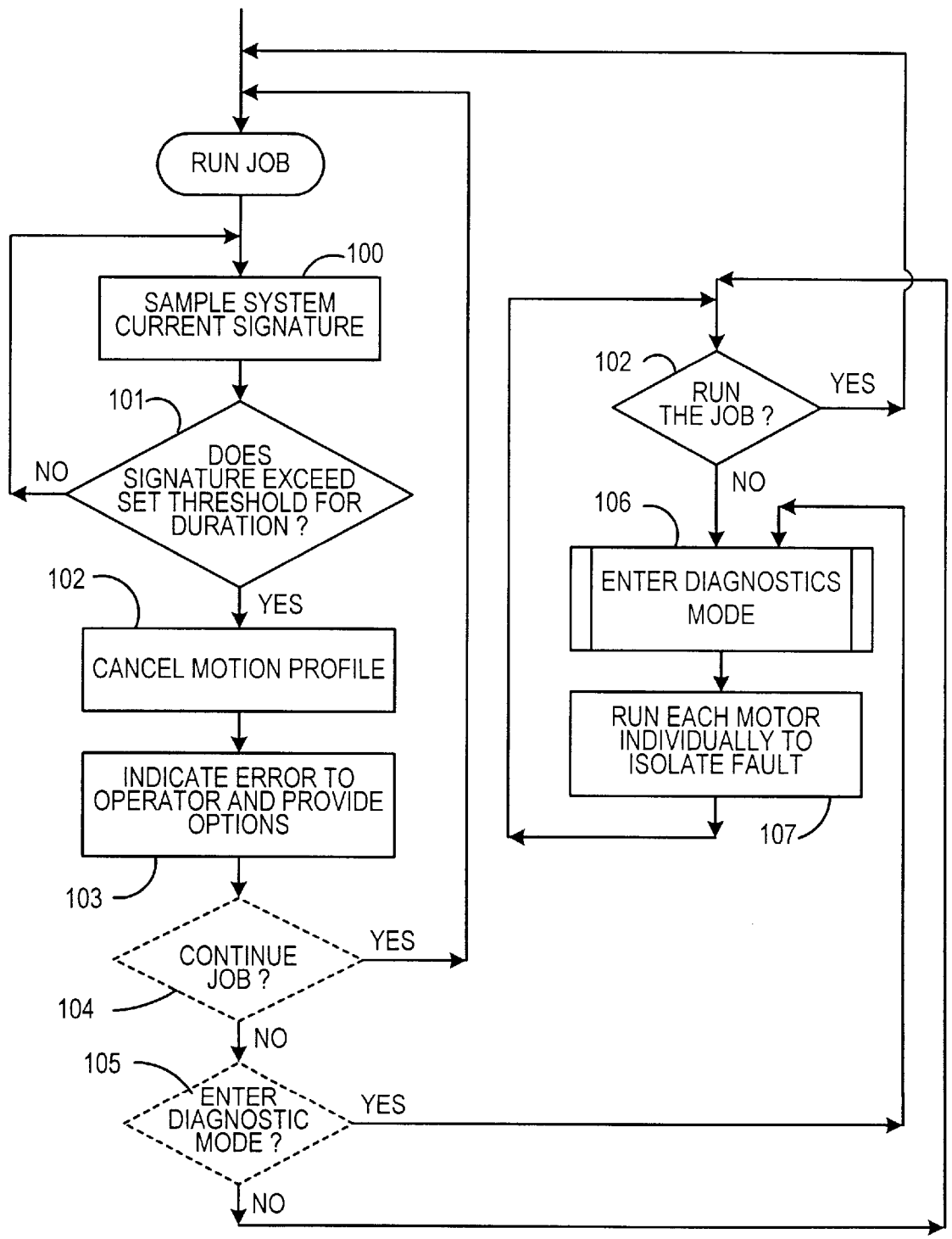
FIG. 3 is a drawing of a flow chart of the program that controls microprocessor 21.

FIG. 3 is a drawing of a flow chart of the program that controls microprocessor 21. The program begins at run job and proceeds to block 100 to sample the system current signature, i.e., the current at point A in FIG. 1. Then, the program goes to decision block 101 to determine whether or not the signature exceeds the set threshold for a set duration of time. If the signature does not exceed the set threshold, then the program proceeds back to block 100 to sample the system current signature. If the signature does exceed the set threshold, then the program goes to block 102 to cancel the motion profile. The set thresholds are determined by previous experiences with the system and may be different on a job-by-job basis.

Now the program goes to block 103 and indicates the error to the system operator. At this point, the program goes to decision block 104 to determine whether or not the operator wants to continue the job. If the operator wants to continue the job and ignore the potential paper jam, the program goes back to run. If the operator does not want to continue the job, the program goes to decision block 105. Block 105 determines whether or not the operator wants the system to enter the diagnostic mode. If decision block 105 determines that the operator wants to enter the diagnostic mode, then the program proceeds to block 106 and enters the diagnostic mode. At this juncture, the program proceeds to block 107. Block 107 runs diagnostic programs individually on motors 11, 12 and 13 of FIG. 1 to isolate the fault. The diagnostic programs may inform the operator to take some corrective action on the system. This corrective action may correct a serious problem before it happens or reduce the number of service calls that are required to maintain the system. Then the program goes to decision block 108. Block 108 determines whether or not the operator wants to run the job. If decision block 108 determines that the operator does not want run the job, the program goes to block 106 and reenters the diagnostic mode. If block 108 determines that the operator wants to run the job, the program goes back to run job. If decision block 105 determined that the operator did not want to enter the diagnostic mode the program would go to the input of decision block 108.

The above specification describes a new and improved sensing system that senses current in order to limit motors torque. It is realized that the above description may indicate to those skilled in the art additional ways in which the principles of this invention may be used without departing from the spirit. It is, therefore, intended that this invention be limited only by the scope of the appended claims.

What is claimed is:

1. A system for controlling the torque of the shafts of one or more motors, wherein each motor is connected to a load, said system comprising:

means for sensing the current used to power the motors;

means for converting the sensed current into digital signals;

means for determining the amplitude and duration of time that the digital signal is present; and adjustable means for deciding when the sensed signal is above an adjustable amplitude and adjustable duration threshold.

2. The system claimed in claim 1, further including means for turning the motors off when the adjustable means decides that the motor is above the adjusted threshold.

3. The system claimed in claim 2, wherein the motor is turned off before the motor can cause damage to the system.

4. The system claimed in claim 2, wherein the motor is turned off before a fuse is blown.

5. The system claimed in claim 2, wherein the motor is turned off before a PTC is activated.

6. The system claimed in a claim 2, wherein the motor is turned off before any mechanical damage may occur.

7. The system claimed in claim 2, wherein the adjustable means is a microprocessor.

8. The system claimed in claim 2, wherein the adjustable means turns off the motor before a predetermined amount of power has been sent to the motor.

9. The system claimed in claim 1, wherein the currents may be individually sensed for each of the motors with unique thresholds and durations for each of the motor.

10. The system claimed in claim 1, wherein the current may be sensed for all of the motors.

* * * * *